Figure 1:
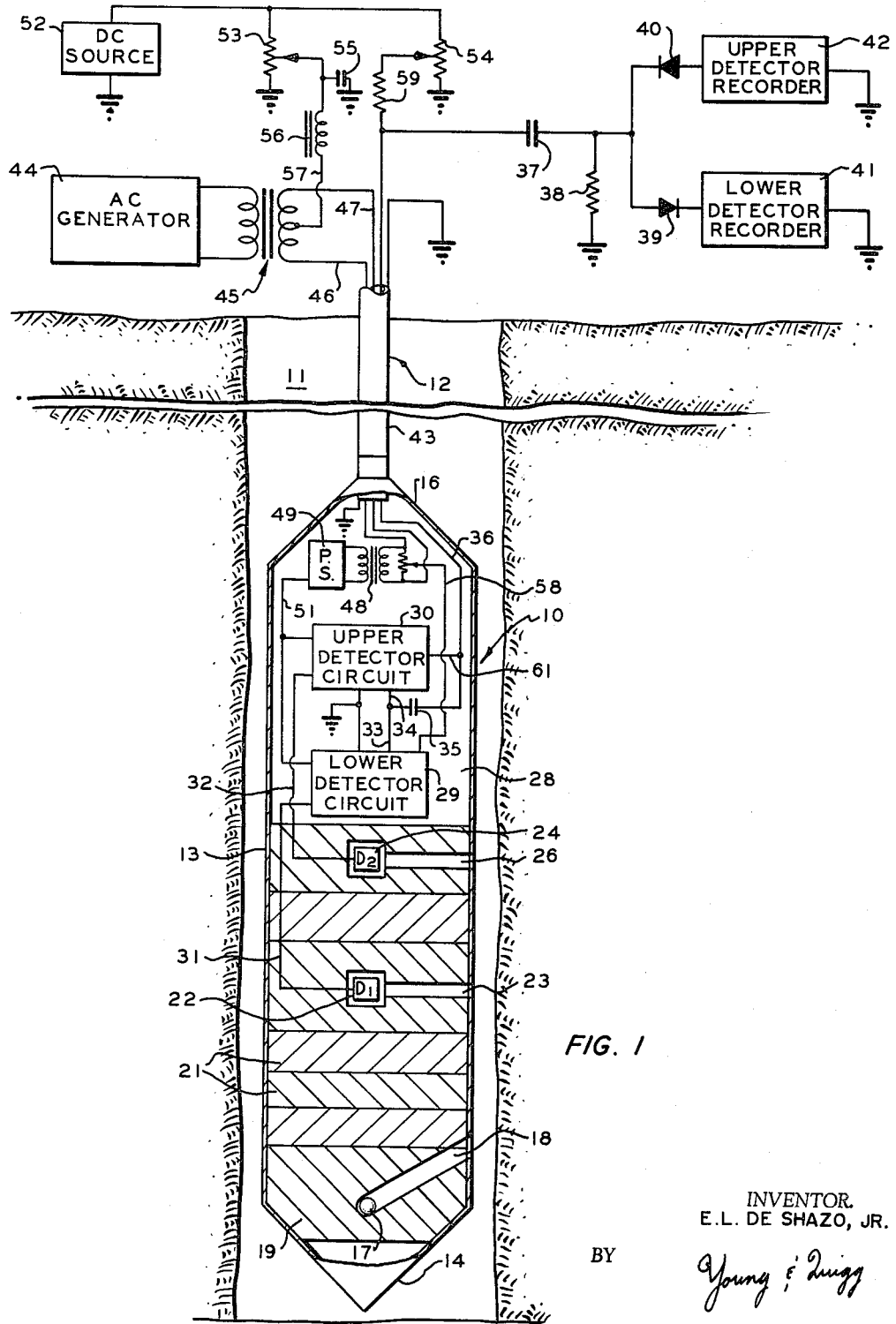

INVENTOR.
E.L. DE SHAZO, JR.

BY

*Young & Quigg*

ATTORNEYS

United States Patent Office 3,223,968
Patented Dec. 14, 1965

3,223,968
MULTIPLE ELECTRICAL TRANSMISSION SYSTEM UTILIZING COMMON CONDUCTORS
Earl L. De Shazo, Jr., Bartlesville, Okla., assignor to Phillips Petroleum Company, a corporation of Delaware
Filed Dec. 3, 1962, Ser. No. 241,973
8 Claims. (Cl. 340—18)

This invention relates to electrical transmission apparatus. In one aspect the invention relates to means for transmitting power and information signals to and from a well logging sonde. In another aspect the invention relates to apparatus for obtaining two radiation logs simultaneously. In yet another aspect the invention relates to improved means for determining the density of earth formations.

Radioactivity has long been used for the determination of the density of materials. The simplest way is to measure the attenuation of a beam of photons passing through the material of interest. An example of this method is the measurement of the density of soil, where a source of gamma rays and a detector are lowered into the ground in two different holes. In this case, the intensity I registered by the detector is $I = I_0 e^{-\mu L}$, where $I_0$ is the intensity before absorption, L is the distance between the source and the detector, and $\mu$ the absorption coefficient of the soil. This $\mu$ is a measure of the number of electrons present in a unit of volume, and thus of the density. Very often, however, the material of interest cannot be placed between the source and the detector. In this case gamma scattering methods, where a collimated source and a detector are placed on the surface of the material, must be used. The backscattered photons (Compton scattering) are registered by the detector. Since the number of backscattered photons depends on the electron density of the material, a count thereof is a measure of the density of said material. The physics of an instrument suitable for making such a measurement are very complicated because the detector registers photons of different energies (due to different scattering angles), and also because the photons are attentuated during their passage through the material. The attentuation of said photons is also a function of the electron density of said material. The situation becomes even more complicated, when the material of interest is not directly accessible as when other substances, such as the wall of a container or a protective coating, are placed between said material and the measuring instrument. In such cases the measured data cannot be interpreted universally and individual calibration curves must be taken for each condition.

In oil exploration and recovery operations, it is often useful to have information regarding geological strata penetrated by bore holes. One important property that can be measured to provide such information is the density of the formation or formations penetrated by the bore hole. Different types of earth formations have different densities so that a knowledge of said densities is of value in identifying the particular formations. If the rock matrix is known, a knowledge of the formation density enables the determination of the porosity of the formation. The interpretation of seismograph and gravity meter data can be considerably improved by correlation with density logs revealing some of the major changes in the lithology. Rock densities are often closely associated with seismic wave transmitting properties and it is thus apparent that a knowledge of the depths at which density changes occur is highly valuable in predicting where major reflections should be obtained in seismic prospecting. A knowledge of the depth and extent of formations having densities contrasting with neighboring formations is an aid in overcoming the problem of lack of resolution in gravimetric prospecting.

Gamma-gamma well logging methods employing "densilog" devices are commonly run for the measurement of the density of the formations penetrated by a bore hole. In such methods, the density measurement is strongly influenced by the separation of the sonde from the wall of the bore hole. This separation can be caused by crooked holes, by cave-ins, and by varying thickness of the mud cake on the wall of the bore hole. In all of these situations unknown amounts of materials are positioned between the logging instrument and the formation.

One system which has been devised for overcoming the above described difficulties in measuring the density of formations penetrated by a bore hole, and other materials which are not directly accessible, broadly speaking, comprises passing gamma rays from a source into a material along at least one path at an incident angle $\phi$ with respect to a reference plane in which said source is positioned; receiving respectively from within said material on first and second detectors which are unequally spaced apart from said source, those Compton scattered photons which have been scattered at an angle $\theta$ with respect to said path of said gamma rays, and measuring the ratio of the response of said detectors.

In accordance with the present invention there is provided an improved electrical transmission system for transmitting power and information signals and which is particularly suited for the transmission of power and signals to and from a well logging sonde, such as a sonde utilized for gamma-gamma density measurements. There is provided a cable having three internal conductors, with one of said conductors being utilized in combination with the cable sheath to transmit a first D.C. reference signal from the earth surface to one of the detector circuits in the sonde and to transmit the output signals from both detector circuits to recording equipment at the earth surface. The remaining two conductors are utilized to transmit A.C. power to the power supply in the sonde and also form part of a phantom circuit for transmitting a second D.C. reference signal from the earth surface to the other of the detector circuits in the sonde.

Accordingly it is an object of the invention to provide an improved electrical transmission system. It is also an object of the invention to provide a means for transmitting power and information signals to and from a logging sonde. Another object of the invention is to provide a bore hole telemetering system requiring a minimum number of conductors. Another object of the invention is to provide improved apparatus for logging in a bore hole. A still further object of the invention is to provide improved means for determining density of earth formations surrounding a bore hole.

Figure 2:
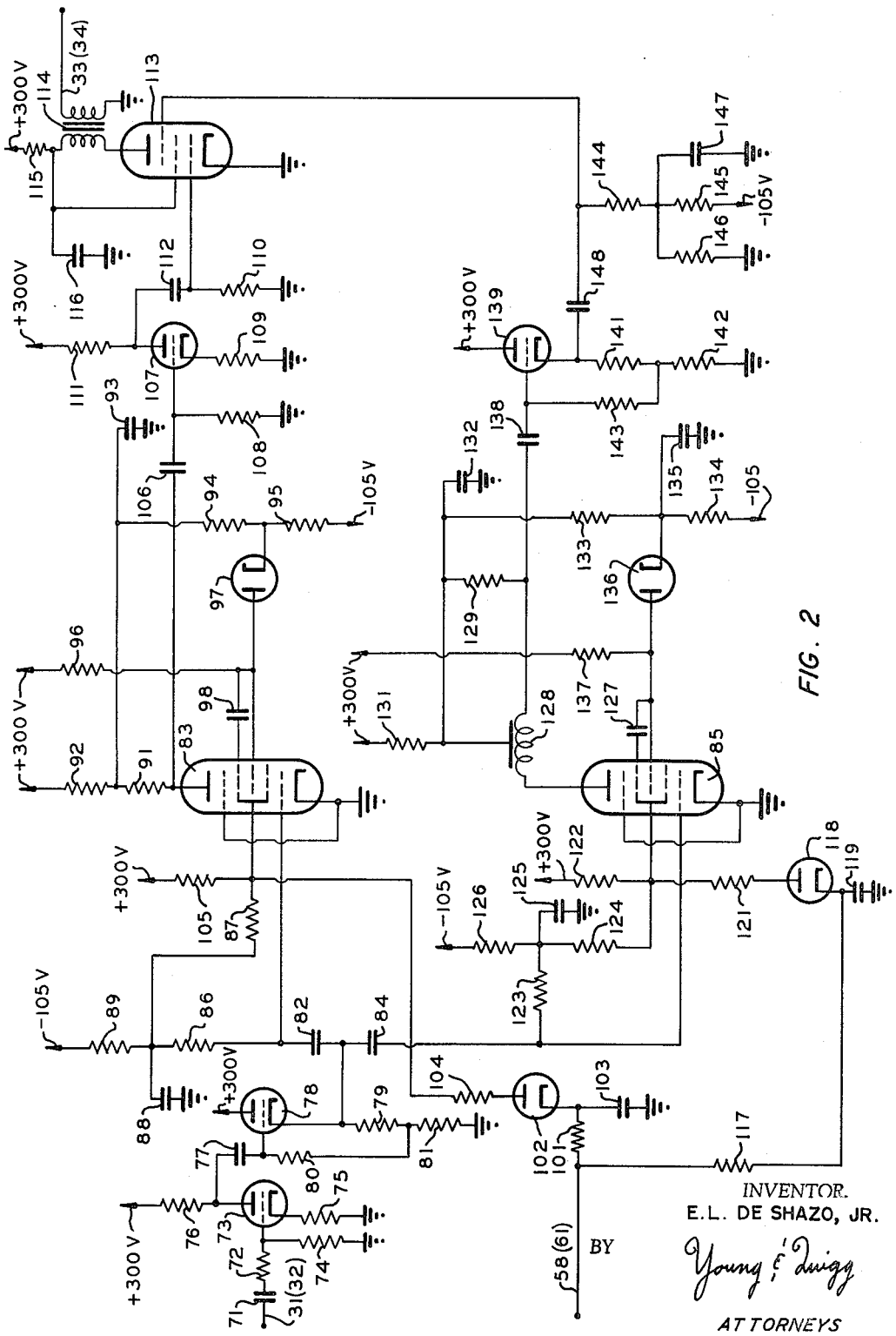

Other aspects, objects and advantages of the invention will be apparent from a study of the disclosure, the appended claims to the invention, and the accompanying drawings in which FIGURE 1 is a diagrammatical representation of a well logging apparatus positioned in a bore hole and embodying the present invention, and FIGURE 2 is a schematic circuit presentation of the electrical components of the detector circuits of FIGURE 1.

Referring now to the drawings, and to FIGURE 1 in particular, there is shown a logging sonde, designated generally by the reference numeral 10, positioned in a bore hole 11 by means of cable 12 of conventional type adapted to accommodate three or more electrical leads described further hereinafter. Although not shown in the drawing, it will be understood that said sonde 10 can be raised and lowered in bore hole 11 by means of suitable conventional operation equipment positioned at the surface of the earth. Such equipment comprises a motivated reel by means of which cable 12 can be used to raise and lower said sonde, and the signals from said sonde correlated with the depth thereof in the bore hole. An example of such equipment can be found in Patent No. 2,916,691.

Said sonde 10 comprises a housing 13 of substantially gamma ray transparent material, such as aluminum, and is provided with a conical closure member 14 at its lower end and a conical cap structure 16 at its upper end. Although not shown in the drawing, it will be understood that said conical closure member 14 and said conical cap 16 can be detachably secured to said housing 13 as by means of threads or other conventional means. Positioned within the lower portion of said housing in a block of shielding material 19 is a source 17 of gamma rays, such as $Co^{60}$ or $Cs^{137}$. Said source of gamma rays is positioned within collimating means 18 comprising a relatively narrow slot in shielding material 19. As is well known to those skilled in the art, the purpose of said collimating slot is to direct the gamma rays emanating from said source into the material being investigated at a predetermined angle. A first detector 22, also designated generally as $D_1$, is positioned within said housing as indicated and is provided with a collimating slot 23. A second detector 24, also designated generally as $D_2$, and provided with a collimating slot 26, is also positioned in said housing. A suitable number of blocks 21 of shielding material are positioned within said housing between said source and said detectors as indicated. Said blocks 21 and block 19 can be any of the known gamma ray shielding materials, such as lead, bismuth, tungsten, or high tungsten alloys. Detectors $D_1$ and $D_2$ and source 17 can be positioned in the same reference plane which preferably contains the axis of sonde 10.

Detectors $D_1$ and $D_2$ can be any suitable type of conventional detector for receiving backscattered photons from the material being investigated. One presently preferred type of detector is a conventional scintillation type comprising a sodium iodide, thallium activated, crystal and a photomultiplier tube.

Positioned within space 28 are suitable detector circuits 29 and 30. Lead wires 31 and 32 are provided for connecting first output terminals of detectors $D_1$ and $D_2$ to detector circuits 29 and 30, respectively, the second output terminals of detectors $D_1$ and $D_2$ being grounded. One of the output terminals of each detecting circuits 29 and 30 is connected by way of lines 33 and 34, respectively, to a first side of isolating capacitor 35. The other output terminals of circuits 29 and 30 are connected to ground. The second side of capacitor 35 is connected by way of conductor 36 to a first side of isolating capacitor 37 in the equipment located at the earth surface. The second side of capacitor 37 is connected to ground through resistor 38 and is also connected to the cathode of rectifier 39 and the anode of rectifier 40. The anode of rectifier 39 is connected to one input terminal of lower detector recorder 41 while the cathode of rectifier 40 is connected to one input terminal of upper detector recorder 42, the other input terminal of each of recorders 41 and 42 being connected to ground. Sheath 43 of cable 12 is grounded to form the return path to the sonde 10.

Power for the operation of the electrical equipment in sonde 10 is provided by means of A.C. generator 44, the output terminals of which are connected to the primary winding of transformer 45. Conductors 46 and 47 connect the ends of the secondary winding of transformer 45 to respective ends of the primary winding of transformer 48, located in sonde 10. The secondary winding of transformer 48 is connected between the input terminals of power supply 49, wherein the A.C. voltage is converted to the desired values of D.C. voltage. The output terminals of power supply 49 are connected to power input terminals of circuits 29 and 30 by suitable conductors represented schematically by cable 51. D.C. biasing voltage for circuits 29 and 30 is provided by means of D.C. source 52 which has one output terminal connected directly to ground and the other output terminal connected through potentiometers 53 and 54, in parallel, to ground. The contactor of 53 is connected through capacitor 55 to ground and also through coil 56 and conductor 57 to the center of the secondary winding of transformer 45. The center of the primary winding of transformer 48 is connected to the D.C. bias input terminal of detector circuit 29 by way of conductor 58. Thus transformers 45 and 48 and conductors 46, 47, 57 and 58 in combination with the grounded sheath of cable 12 form a phantom circuit for the transmission of A.C. power from generator 44 to power supply 49 and a D.C. bias voltage from potentiometer 53 to detector circuit 29.

The contactor of potentiometer 54 is connected through resistor 59, conductor 36 and conductor 61 to the D.C. bias input terminal of detector circuit 30. Thus conductor 36 and the grounded sheath of cable 12 transmit the D.C. bias voltage from potentiometer 54 to detector circuit 30 while simultaneously transmitting the pulse outputs of detector circuits 29 and 30 to the surface equipment. Capacitors 35 and 37 function as isolation capacitors to separate the A.C. output circuit from the D.C. bias circuit in the sonde and in the surface equipment while permitting the two circuits to utilize common conductor 36 in cable 12.

No specific means has been illustrated for supporting source 17, detector $D_1$, detector $D_2$ and detector circuits 29 and 30 or the shielding material, in housing 13. Such supporting means form no part of the invention and any suitable mechanical means can be provided for retaining the various components in their proper positions relative to said housing 13. Although said source 17 has been here illustrated as being positioned in the lower portion of housing 13 and the detector circuits 29 and 30 and power source 49 positioned in the upper portion of said housing, it will be understood that the respective positions of said elements can be reversed, or arranged in any other suitable manner. The arrangement shown is that most commonly preferred.

Referring now to FIGURE 2 there is shown a schematic circuit diagram of a single channel pulse height analyzer which can be utilized in detector circuits 29 and 30. The circuits will be described in terms of detector circuit 29 with the corresponding connections for detector circuit 30 being indicated in parenthesis. One output terminal of $D_1$ ($D_2$) is connected by way of conductor 31 (32), capacitor 71 and resistor 72 to the grid of triode 73 which is also connected to ground by way of resistor 74. The cathode of triode 73 is connected to ground by way of resistor 75 while the anode is connected through resistor 76 to a suitable source of positive D.C. voltage, such as 300 volts. The anode of triode 73 is also connected through capacitor 77 to the grid of triode 78. The cathode of triode 78 is connected through resistors 79 and 81 to ground with resistor 80 being connected between the grid of triode 78 and the junction between resistors 79 and 81. The anode of triode 78 is connected to a suitable source of positive D.C. voltage. The cathode of triode 78 is connected through capacitor 82 to the first control grid of pentagrid tube 83 and also through capacitor 84 to the first control grid of pentagrid tube 85. The first control grid of pentagrid tube 83 is connected through resistors 86 and 87 to the first and second screen grids of pentagrid tube 83. The junction between resistors 86 and 87 is connected to ground through capacitor 88 and is also connected to a source of negative D.C. voltage by way of resistor 89. The suppressor grid and cathode of pentagrid tube 83 are connected to each other and to ground. The anode of pentagrid tube 83 is connected through resistors 91 and 92 to a suitable source of positive D.C. voltage. The juncture between the resistors 91 and 92 is connected to ground by way of capacitor 93 and is also connected through resistors 94 and 95 to a suitable source of negative D.C. voltage. The second control grid of pentagrid 83 is connected through resistor 96 to a suitable source of positive D.C. voltage and is also connected to the anode of diode 97 with the cathode of diode 97 being connected to the junction between resistors 94 and 95. The first screen grid of pentagrid 83 is connected to the second screen grid thereof which in turn is connected through capacitor 98 to the second control grid of pentagrid tube 83.

The D.C. bias voltage is applied by way of conductor 58 (61) and resistor 101 to the cathode of diode 102. The cathode of diode 102 is connected to ground by way of capacitor 103 while the anode of diode 102 is connected through resistor 104 to the first and second screen grids of pentagrid tube 83. The first and second screen grids of pentagrid tube 83 are also connected to a suitable source of positive D.C. voltage by way of resistor 105.

The anode of pentagrid tube 83 is connected through capacitor 106 to the grid of triode 107. The grid of triode 107 is connected to ground through resistor 108 while the cathode of triode 107 is connected to ground through resistor 109. The anode of triode 107 is connected to a suitable source of positice D.C. voltage by way of resistor 111 and is also connected through capacitor 112 to the control grid of pentode 113. The control grid of pentode 113 is connected to ground through resistor 110 while the cathode is connected directly to ground. The anode of pentode 113 is connected through the primary winding of transformer 114 and resistor 115 to a suitable source of positive D.C. voltage. The junction between the primary winding of transformer 114 and resistor 115 is connected to the screen grid of pentode 113 and is also connected to ground by way of condenser 116.

Conductor 58 (61) is also connected through resistor 117 to the cathode of diode 118. The cathode of diode 118 is connected to ground through capacitor 119 while the anode of diode 118 is connected through resistors 121 and 122 to a suitable source of D.C. voltage with the junction between resistors 121 and 122 being connected to the first and second screen grids of pentagrid tube 85. The first control grid of pentagrid tube 85 is connected through resistors 123 and 124 to the first and second screen grids thereof. The junction between resistors 123 and 124 is connected to ground by way of capacitor 125 and is also connected through resistor 126 to a suitable source of negative D.C. voltage. The cathode and the suppressor grid of pentagrid tube 85 are connected to ground. The first and second screen grids of pentagrid tube 85 are connected to each other with the second screen grid being connected to the second control grid through capacitor 127. The anode of pentagrid tube 85 is connected through the coil of delay line 128 and resistors 129 and 131 to a suitable source of positive D.C. voltage. The junction between resistors 129 and 131 is connected to the shield of delay line 128 and is also connected through capacitor 132 to ground and is further connected through resistors 133 and 134 to a suitable source of negative D.C. voltage. The junction between resistors 133 and 134 is connected through capacitor 135 to ground and is also connected to the cathode of diode 136. The anode of diode 136 is connected to the second control grid of pentagrid tube 85 and is also connected through resistor 137 to a suitable source of positive D.C. voltage. The junction between the coil of delay line 128 and resistor 129 is connected through capacitor 138 to the grid of triode 139. The anode of triode 139 is connected to a suitable source of positive D.C. voltage while the cathode thereof is connected through resistors 141 and 142 to ground. Resistor 143 is connected between the grid of triode 139 and the junction between resistors 141 and 142. The cathode of triode 139 is connected through capacitor 148 to the suppressor grid of pentode 113. The suppressor grid of pentode 113 is also connected through resistors 144 and 145 to a suitable source of negative D.C. voltage with the junction between resistors 144 and 145 being connected to ground through resistor 146 and capacitor 147 in parallel. The connection for transformer 114 in detector circuit 29 is reversed from that of the connection for transformer 114 in detector 30 so that the output pulses of detector circuits 29 and 30 are of opposite polarity. Although it is possible for detector circuits 29 and 30 to produce an output signal simultaneously and thus to cancel each other, the statistical occurrence of such a simultaneous production of output pulses is sufficiently low, due to the ratio of the amount of time between pulses to the time length of a single pulse, that it can be disregarded. The problem of simultaneous production of pulses can be avoided, if desired, by utilizing pulses of different amplitudes or width for each detector circuit output. The secondary winding of transformer 114 is connected between conductor 33 (34) and ground.

Pentagrid tubes 83 and 85 constitute the basic elements of two discriminating circuits. The second control grid of each of pentagrid tubes 83 and 85 controls the division of cathode current between the screen grids and the anode. The connection of capacitors 98 and 127 between the respective screen grids and control grid of pentagrid tubes 83 and 85 effects a negative resistance so that a negative change in screen potential is transmitted through the capacitor to the respective second control grid causing an increase in screen current at the expense of anode current. Each of the diodes 97 and 136 is operated in the retarding-field region and as a positive resistance to prevent the circuits from oscillating. Each of the discriminators will trigger when the positive input to the respective triode is increased to reach the value of the negative resistance. This occurs when a positive pulse of sufficient amplitude is applied to the first control grid of the respective pentagrid tube. The output of the two discriminators are of opposite polarity due to the reversal of connections on triodes 107 and 139. Pentode 113 and triodes 107 and 139 constitute an anti-coincidence circuit.

While the detector circuits disclosed in FIGURE 2 are the present preferred embodiment, any suitable detector circuit which produce a single polarity pulse output can be utilized.

In operation source 17, such as $Co^{60}$, $Cs^{137}$, or $Hg^{203}$, emits a combined beam of gamma rays into the formation. Detectors $D_1$ and $D_2$ can be of the scintillation type, for example a sodium iodide, thallium activated crystal and a photomultiplier tube. Detector circuits 29 and 30 are adjusted to be sensitive to photons of only one predetermined energy, for example 200 kev. Since the energy of scattered Compton photons is dependent on the scattering angle, the collimated detectors will see radiation coming from only one direction. The outputs of detectors $D_1$ and $D_2$ can be recorded separately by recorders 41 and 42 or they can be applied directly to an input or a ratio circuit to obtain the ratio of the outputs of the two detectors. The ratio of the output of detector $D_1$ to the output of detector $D_2$ will be relatively small if the formation is very dense (less porous) and will be relatively large if the formation is less dense (more porous.)

While the present invention has been described in terms of a density logging apparatus utilizing two scintillation crystals, it is within the contemplation of the invention to utilize the transmission circuits of the invention for any two signal producing circuits where the output signals for each circuit are in the form of single polarity pulses. For example, the transmission circuits of the invention can be utilized with a radiation detector and a collar locator. The pulses can be information carrying signals by the variations in the width of the pulses, the amplitude of the pulses, the number of pulses, the rate of occurrence of the pulses, the presence of the pulses, etc.

Accordingly, reasonable variations and modifications are possible within the foregoing disclosure, the drawings and the appended claims to the invention.

I claim:

1. An electrical transmission system comprising first and second means for producing electrical pulses of opposite polarity, substantially all of the pulses produced by said first means occurring at different times from the pulses produced by said second means, each of said first and second means having first and second output terminals; one of said first and second means having a D.C. input terminal; first and second capacitors; means connecting the first output terminal of each of said first and second means to a first side of said first capacitor; a first electrical conductor connected between a second side of said first capacitor and a first side of said second capacitor; a second electrical conductor having a first end thereof connected to each of the second output terminals of said first and second means; a source of direct current connected between said first side of said second capacitor and the second end of said second electrical conductor; means connected between said second side of said first capacitor and said first end of said second electrical conductor for applying the direct current voltage between said second side of said first capacitor and said first end of said second electrical conductor to said D.C. input terminal; and means connected between the second side of said second capacitor and said second end of said second electrical conductor for receiving the pulses appearing therebetween.

2. An electrical transmission system comprising first and second means for producing electrical pulses of opposite polarity, substantially all of the pulses produced by said first means occurring at different times from the pulses produced by said second means, each of said first and second means having first and second output terminals; each of said first and second means having a D.C. input terminal; first and second capacitors; means connecting the first output terminal of each of said first and second means to a first side of said first capacitor; a first electrical conductor connected between a second side of said first capacitor and a first side of said second capacitor; a second electrical conductor having a first end thereof connected to each of the second output terminals of said first and second means; means connected between the second side of said second capacitor and the second end of said second electrical conductor for receiving the pulses appearing therebetween; a source of direct current connected between said first side of said second capacitor and the second end of said second electrical conductor; means connected between said second side of said first capacitor and said first end of said second electrical conductor for applying the direct current voltage to said D.C. input terminal of said first means; a source of alternating current; a first transformer having a primary winding and a secondary winding; a second transformer having a primary winding and a secondary winding; means for connecting said source of alternating current across said primary winding of said first transformer; third and fourth electrical conductors connecting the ends of said second winding of said first transformer to the respective ends of said primary winding of said second transformer; means connected across said secondary winding of said second transformer for utilizing the A.C. voltage appearing across said secondary winding of said second transformer; means for connecting a source of direct current between the center of said secondary winding of said first transformer and said second end of said second electrical conductor; and means connected between the center of the primary winding of said second transformer and said first end of said second electrical conductor to apply the direct current voltage therebetween to said D.C. input terminal of said second means.

3. An electrical transmission system comprising first and second means for producing electrical pulses of opposite polarity, substantially all of the pulses produced by said first means occurring at different times from the pulses produced by said second means, each of said first and second means having first and second output terminals; at least one of said first and second means having a D.C. input terminal; first and second capacitors; means connecting the first output terminal of each of said first and second means to a first side of said first capacitor; a first electrical conductor connected between a second side of said first capacitor and a first side of said second capacitor; a second electrical conductor having a first end thereof connected to each of the second output terminals of said first and second means; a source of direct current connected between said first side of said second capacitor and the second end of said second electrical conductor; means connected between said second side of said first capacitor and said first end of said second electrical conductor for applying the direct current voltage between said second side of said first capacitor and said first end of said second electrical conductor to said D.C. input terminal; a first rectifying means having an anode and a cathode; a second rectifying means having an anode and a cathode; means connecting the anode of said first rectifying means and the cathode of said second rectifying means to the second side of said second capacitor; means connected between said cathode of said first rectifying means and said second end of said second electrical conductor for receiving the pulses appearing therebetween; and means connected between said anode of said second rectifying means and said second end of said second electrical conductor for receiving the pulses appearing therebetween.

4. A bore hole logging system comprising, in combination, a logging sonde, first and second means for producing information-containing output pulses of opposite polarity, substantially all of the pulses produced by said first means occurring at different times from the pulses produced by said second means, each of said first and second means having first and second output terminals and being positioned in said sonde; first and second capacitors; means for connecting the first output terminal of each of said first and second means to a first side of said first capacitor; a cable connected to said sonde and adapted to raise and lower said sonde in a bore hole and comprising at least a first electrical conductor and a second electrical conductor; means for connecting said first electrical conductor between a second side of said first capacitor and a first side of said second capacitor; means for connecting the second output terminals of each of said first and second means to one end of said second electrical conductor; means for recording the voltage appearing between the second side of said second capacitor and the second end of said second electrical conductor; a source of direct current connected between said first side of said second capacitor and said second end of said second electrical conductor; and means in said sonde connected between said second side of said first capacitor and said first end of said second electrical conductor for supplying a D.C. voltage in said sonde.

5. A bore hole logging system comprising, in combination, a logging sonde, first and second means for producing information-containing output pulses of opposite polarity, substantially all of the pulses produced by said first means occurring at different times from the pulses produced by said second means, each of said first and second means having first and second output terminals and being positioned in said sonde; each of said first and second means having a D.C. input terminal; first and second capacitors; means for connecting the first output terminal of each of said first and second means to a first side of said first capacitor; a cable connected to said sonde and adapted to raise and lower said sonde in a bore hole and comprising at least first, second, third and fourth electrical conductors; means for connecting said first electrical conductor between a second side of said first capacitor and a first side of said second capacitor; means for connecting the second output terminal of each of said first and second means to one end of said second electrical conductor; means for recording the voltage appearing between the second side of said second capacitor and the second end of said second electrical conductor; a source of direct current connected between said first side of said second capacitor and said second end of said second electrical conductor; means in said sonde connected between said second side of said first capacitor and said first end of said second electrical conductor for supplying a D.C. voltage to said D.C. input terminal of said first means; a source of alternating current; a first transformer having a primary winding and a secondary winding; a second transformer having a primary winding and a secondary winding; means for connecting said source of alternating current across said primary winding of said first transformer; said third and fourth electrical conductors connecting the ends of said secondary winding of said first transformer to the respective ends of said primary winding of said second transformer; means connected across said secondary winding of said second transformer for utilizing the A.C. voltage appearing across said secondary winding of said second transformer; means for connecting a source of direct current between the center of said secondary winding of said first transformer and said second end of said second electrical conductor; and means connected between the center of the primary winding of said second transformer and said first end of said second electrical conductor to apply the direct current voltage therebetween to said D.C. input terminal of said second means.

6. Apparatus in accordance with claim 5 wherein each of said first and second means comprises a scintillation detector and a single channel pulse height analyzer, and the direct current voltage applied to each of said first and second means is a bias voltage for controlling the threshold level of the respective pulse height analyzer.

7. Apparatus in accordance with claim 6 wherein said means for recording comprises a first rectifying means having an anode and a cathode, a second rectifying means having an anode and a cathode, means connecting the anode of said first rectifying means and the cathode of said second rectifying means to the second side of said second capacitor, means connected between said cathode of said first rectifying means and said second end of said second electrical conductor for recording the pulses appearing therebetween, and means connected between said anode of said second rectifying means and said second end of said second electrical conductor for recording the pulses appearing therebetween.

8. A bore hole logging system comprising, in combination, a logging sonde, first and second means for producing information-containing output pulses of opposite polarity, substantially all of the pulses produced by said first means occurring at different times from the pulses produced by said second means, each of said first and second means having first and second output terminals and being positioned in said sonde; first and second capacitors; means for connecting the first output terminal of each of said first and second means to a first side of said first capacitor; a cable connected to said sonde and adapted to raise and lower said sonde in a bore hole and comprising at least a first electrical conductor and a second electrical conductor; means for connecting said first electrical conductor between a second side of said first capacitor and a first side of said second capacitor; means for connecting the second output terminal of each of said first and second means to one end of said second electrical conductor; a source of direct current connected between said first side of said second capacitor and said second end of said second electrical conductor; means in said sonde connected between said second side of said first capacitor and said first end of said second electrical conductor for supplying a D.C. voltage in said sonde; a first rectifying means having an anode and a cathode; a second rectifying means having an anode and a cathode; means connecting the anode of said first rectifying means and the cathode of said second rectifying means to the second side of said second capacitor; means connected between said cathode of said first rectifying means and said second end of said second electrical conductor for recording the pulses appearing therebetween; and means connected between said anode of said second rectifying means and said second end of said second electrical conductor for recording the pulses appearing therebetween.

References Cited by the Examiner
UNITED STATES PATENTS

| | | | |
|---|---|---|---|
| 2,617,852 | 11/1952 | Waters | 340—18 |
| 2,942,112 | 6/1960 | Hearn | 340—18 |
| 3,103,644 | 9/1963 | Burton | 340—18 |

BENJAMIN A. BORCHELT, *Primary Examiner.*

CHESTER L. JUSTUS, *Examiner.*